United States Patent [19]

Berg

[11] 4,011,779
[45] Mar. 15, 1977

[54] APPARATUS FOR CUTTING AN ELONGATE MEMBER OF ARBITRARY LENGTH INTO SHORTER SECTIONS OF PREDETERMINED LENGTHS

[76] Inventor: Gudbrand Gunnarson Berg, 2890 Bruflat, Bruflat, Norway

[22] Filed: Apr. 30, 1976

[21] Appl. No.: 681,887

Related U.S. Application Data

[63] Continuation-in-part of Ser. No. 549,625, Feb. 13, 1975, abandoned, which is a continuation of Ser. No. 447,176, Feb. 28, 1974, abandoned.

[30] Foreign Application Priority Data

Mar. 1, 1973 Norway .............................. 73836

[52] U.S. Cl. ..................................... 83/71; 83/212; 83/268; 83/278; 83/364; 83/365; 83/367; 83/393; 83/467 R

[51] Int. Cl.[2] ........................ B26D 5/38; B26D 5/20

[58] Field of Search .............. 83/71, 207, 210, 212, 83/238, 365, 367, 364, 211, 268, 278, 281, 282, 391, 393, 467, 468

[56] References Cited

UNITED STATES PATENTS

| | | | |
|---|---|---|---|
| 2,069,536 | 2/1937 | Palmer | 83/393 |
| 3,141,367 | 7/1964 | Keener | 83/282 X |
| 3,155,242 | 11/1964 | Magloire | 83/269 X |
| 3,212,380 | 10/1965 | Göbel et al. | 83/393 X |
| 3,244,047 | 4/1966 | Daniluk | 83/282 X |
| 3,319,955 | 5/1967 | Masterson | 83/269 X |
| 3,370,494 | 2/1968 | Schenck | 83/467 X |
| 3,466,958 | 9/1969 | Munson | 83/282 X |
| 3,552,254 | 1/1971 | Marczy | 83/468 X |
| 3,600,993 | 8/1971 | Williams et al. | 83/71 |
| 3,605,540 | 9/1971 | Williams et al. | 83/393 X |
| 3,910,142 | 10/1975 | Jureit et al. | 83/71 |

Primary Examiner—Othell M. Simpson
Assistant Examiner—Horace M. Culver
Attorney, Agent, or Firm—Ladas, Parry, Von Gehr, Goldsmith & Deschamps

[57] ABSTRACT

Apparatus for cutting elongate members of arbitrary length, for example, cants or boards, into shorter sections of predetermined like or unlike lengths, so that each material length is utilized to the maximum with the least possible waste, is provided with a plurality of abutments which may be guided in and out of the direction of travel of the material to determine the length of the different shorter sections. The material to be cut is measured longitudinally while it is advanced towards the cutting element by means of an automatic measuring device which transmits pulses via a programming device which determines the lengths into which various material lengths are to be cut in order to give the least possible waste. The programming device controls the abutments which determine the length of feed of the material in the direction towards the cutting element.

8 Claims, 7 Drawing Figures

APPARATUS FOR CUTTING AN ELONGATE MEMBER OF ARBITRARY LENGTH INTO SHORTER SECTIONS OF PREDETERMINED LENGTHS

CROSS-REFERENCE TO RELATED APPLICATION

This is a continuation-in-part of my prior application Ser. No. 549,625 filed Feb. 13, 1975, and now abandoned, which is itself a continuation of my application Ser. No. 447,176 filed Feb. 28, 1974 and now abandoned.

The present invention relates to apparatus for cutting an elongate member of arbitrary length into shorter sections of predetermined respective lengths.

Automatic cross-cut saws are previously known where the material supplied is automatically cut into sections of predetermined equal lengths. The guiding of the material against the abutments clamping of the material while the cutting takes place and ejection of the cut section, can be carried out by means of mechanical, electromechanical, pneumatic or hydraulic apparatus, all in accordance with what is most practical in the different constructions. For example, in the wood working industry where, for example, sections of board of three different lengths are required for a certain article, so far as is known, cross-cut saws have hitherto been used which are manually operated and the operator himself determines the cutting program which, in most cases, entails a fairly great waste since the lengths of material are not utilized in the most effective manner with respect to the entire length of the material and the lengths of the cut sections. Even though the operator has a predetermined diagram over the material lengths most frequently used and a list of how many sections of each length are to be cut, the utilization of the saw's capacity is low in all cases since much depends on the reaction speed of the operator on reading the diagram and adjusting the various abutment positions.

According to the present invention, there is provided an apparatus for cutting an elongate member of arbitrary length into shorter sections of predetermined respective lengths, comprising a cutting element, means for advancing the elongate member past the cutting element, a plurality of abutment members located at different positions forward of the cutting element, operating means whereby the abutment members are selectively brought into and removed from the path of movement of the elongate member, a plurality of sensor devices arranged at equally spaced intervals to the rear of the cutting element for sensing the length of the elongate member that is to the rear thereof, and programmable means connected between the sensor devices and said operating means to determine which of said abutment members is brought into the path of movement of said elongate member, and thereby the length of the elongate member that is forward of the cutting element, in dependence upon the length of the elongate member that is to the rear of the cutting element.

For a better understanding of the invention, and to show how the same may be carried into effect, reference will now be made, by way of example, to the accompanying drawings in which.

In the different figures, like reference numerals denote like components.

Figure 1:
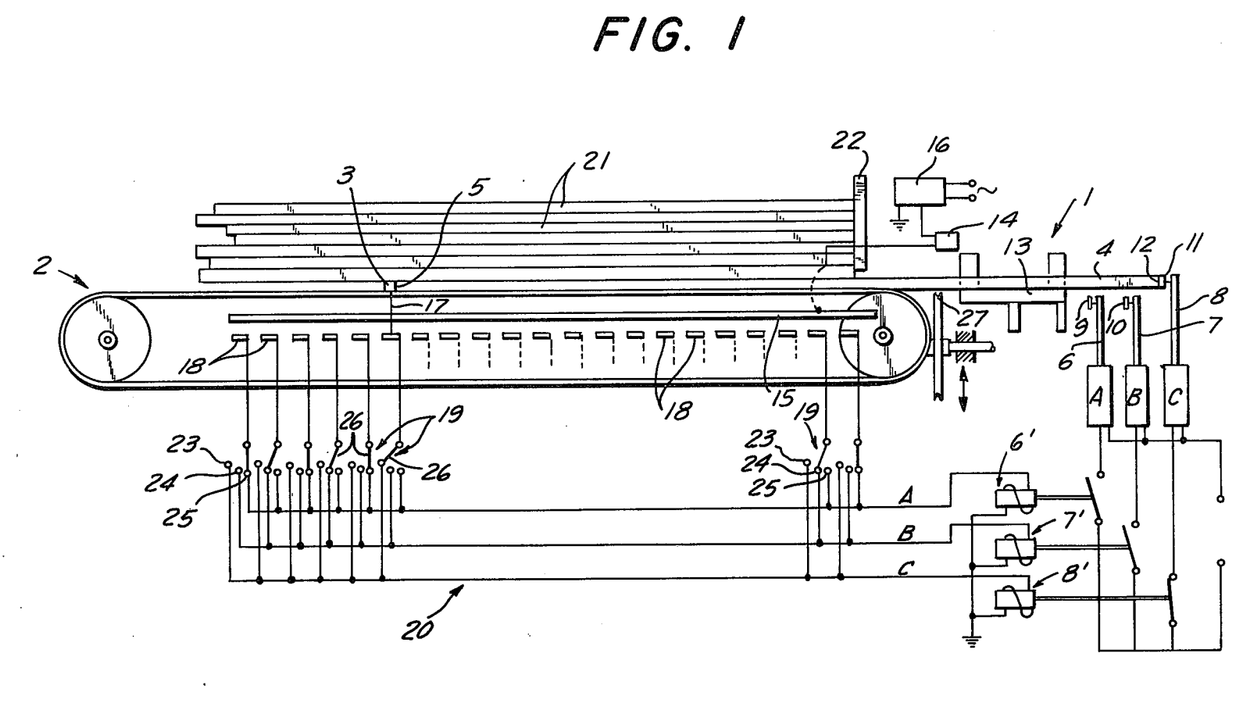
FIG. 1 shows diagrammatically in side elevation a first embodiment of the invention.

FIG. 1 illustrates a cross-cut saw apparatus 1 which is provided with a belt feeding device 2 having a carrier 3 which engages against the rear end 5 of the material 4 to be sawn and advances the material 4 so that its forward end engages an abutment 6, 7 or 8 located in working position. As shown, the material engages the abutment 8. Microswitch 9, 10 and 11 are mounted on the abutments 6, 7 and 8 respectively, and when one of those switches, as shown, the microswitch 11, is engaged by the forward end 12 of the material 4 it causes disconnection of the drive shaft (not shown) of the feeding device 2 so that the material 4 remains stationary between the abutment 8 and the carrier 3. The microswitch 11 will, at the same time, initiate the cutting operation by means not shown, that is to say clamping of the material, guiding of the saw blade 27 to cutting position and ejection of the cut length by means of the ejector 13. On movement of the ejector 13, a microswitch 14 is actuated which, for one instant, connects the bus bar 15 to a low voltage current source 16, so that an electric pulse is applied to the bar 15. A series of bar sections 18 are positioned adjacent the bar 15 and are spaced apart therealong, and a contact member 17 connects the bar 15 to one of the bar sections 18, dependent on the length of the material 4 that is between the saw blade and the carrier. The bar sections 18 are connected to the movable contacts of respective selectors 19 in a programming device 20. Each selector 19 has three fixed contacts 23, 24 and 25 which are connected to lines A, B and C respectively. The movable contact of each selector 19 is preset to one of the fixed contacts. The lines A, B and C are provided with respective relays, not shown. Thus, the electric pulse applied to the bus bar 15 is transmitted via the bar section 18 selected by the contact member 17 and the associated selector 19 to one of the lines A, B and C to energize one of the relays. Energization of the relay actuates a suitable pneumatic or hydraulic apparatus to advance one of the abutments (as shown, the abutment 8) to its working positions. When the ejector 13 returns to its starting position, the feeding means 2 is connected to its drive shaft and advances the material to engage the abutment 6, 7 or 8 which was brought into working position by means of the measuring pulse described hereinabove and the entire work operation as described hereinabove is repeated.

In connection with the feeding means 2 and the carrier 3, a stack of material lengths may be arranged. These material lengths 21 then rest upon the lowest material length 4 and are prevented from being advanced by a stop means 22. Subsequent to the entire length of material 4 being fed, by means of the feeding means 2 and carrier 3, and cut, the possible waste removed, the material lengths 21 fall and the lowest then takes up the position of the original material length 4 and is forwarded by the carrier 3 which, in the meantime has accompanied the feeder of the feeding means 2 throughout its operation and arrived in position at the rear edge 5 of the material length whereby this new material length is forwarded to one of the abutments and the cutting operation is initiated once more.

By means of the above said stacking of the material, the saw may operate continuously, it being necessary to the operator merely to ensure supply of material to the stack. The pieces of different lengths may either be removed manually or thrown on to a transport belt for sorting, packing or direct use depending on the determined further operation. The programming device 20 consists of selectors which, in the example shown, are each provided with three contacts 23, 24 and 25, the said contact groups 23, 24 and 25 being connected in parallel so that the contact groups 23, 24 and 25 are in connection with the respective actuating means for the abutments 6, 7 and 8. That is to say that a measuring pulse received by one of the selector arms 26 of the selectors 9 can effect the movement of any of the abutments 6, 7 and 8 depending on the position of the selector arm in the selector 19. In this manner, it is possible for any length of the material — within practical limits — to determine the length of the next cut by adjustment of the selector arm 26.

In the following, an example is given of the setting up of a cutting diagram and adjustment of the programming device 20 in connection with the production of an article where three different material lengths are required: $A = 75$ cm, $B = 80$ cm and $C = 120$ cm. An equation may be drawn up: $L = xA + yB + zC + r$, herein $L$ represents the length of the material and $x$, $y$ and $z$ the number of cuts of A, B and C respectively and where $r$ signifies the remainder of the material which is not utilizable since it is too short. When cutting the material into A, B and C lengths, it is important that $r$ occurs as little as possible in order thereby to achieve the most effective utilization of the material.

On the basis of the above said equation, the following diagram may be set up, consideration being taken to the fact that each section in the measuring means 20 in the saw is 5 cm.

| L = | xA + | yB + | zC + | r |
|---|---|---|---|---|
| L = | x75 + | y80 + | z120 + | r |
| 400 = | 0 | 2 | 2 | 0 |
| 395 = | 1 | 1 | 2 | 0 |
| 390 = | 2 | 0 | 2 | 0 |
| 385 = | 4 | 1 | 0 | 5 |
| 380 = | 4 | 1 | 0 | 0 |
| 375 = | 5 | 0 | 0 | 0 |
| 370 = | 0 | 3 | 1 | 10 |
| 365 = | 0 | 3 | 1 | 5 |
| 360 = | 0 | 3 | 1 | 0 |
| 355 = | 1 | 2 | 1 | 0 |
| 350 = | 2 | 1 | 1 | 0 |
| 345 = | 3 | 0 | 1 | 0 |
| 340 = | 0 | 1 | 2 | 20 |
| 335 = | 0 | 1 | 2 | 15 |
| 330 = | 0 | 1 | 2 | 10 |
| 325 = | 0 | 1 | 2 | 5 |
| 320 = | 0 | 1 | 2 | 0 |
| 315 = | 1 | 0 | 2 | 0 |
| 310 = | 2 | 2 | 0 | 0 |
| 305 = | 3 | 1 | 0 | 0 |
| 300 = | 4 | 0 | 0 | 0 |
| 295 = | 0 | 2 | 1 | 15 |
| 290 = | 0 | 2 | 1 | 10 |
| 285 = | 0 | 2 | 1 | 5 |
| 280 = | 0 | 2 | 1 | 0 |
| 275 = | 1 | 1 | 1 | 0 |
| 270 = | 2 | 0 | 0 | 0 |
| | 400 | 280 | 160 | 80 |
| | C | C | B | B |

Each of the abutments 6, 7 and 8 may, by means of a special connection, be brought into working position before the measuring impulse is transmitted in connection with the feeding of new material 4, so that priority can be given to the cutting of a determined length, in that the said length is cut as first length of each material length. Assuming that priority is given to abutment 8, and that, in the present example, the abutments 6, 7 and 8, respectively, represent the lengths A, B and C, the first cut of the material 4 will be $C = 120$ cm. If the material 4 was originally 4 meters, one will find in the above diagram that this should be cut in two lengths of 120 cm and two lengths of 80 cm whereby the remainder is 0, that is to say no waste. In order to achieve this division of the material 4, the programming device may be adjusted as follows, provided that the bar sections of 5 cm calculate the material from its rear edge 5 to the cutting location 27. The selector arm 26 on the selector 19 which has contact with the section representing a material length of 280 cm, is set at contact 23 which causes abutment 8 to remain stationary for the next cut. When this cut has been carried out, two lengths A of 120 cm remain and the material is thus to be cut into two lengths of 80 cm. The selector arm 26 on the selector 19 which is in contact with the section for 160 cm is adjusted to contact 24 which causes positioning of abutment 7 for the subsequent cutting operation. The same adjustment is undertaken with the selector for the section representing 80 cm. In this case, the last said adjustment will have no effect since no waste is incurred and the length is already cut. If, on the other hand, the material had been 5 cm longer, the last adjustment would have caused a waste of 5 cm. By adjusting all the selectors in a corresponding manner, all the material lengths according to the diagram between 4 meter and 2.7 meter will be cut in A, B or C lengths with a minimum of waste.

The embodiment example of a cross-cut saw described hereinabove and in accordance with the invention operates discontinuously in that the material length 4 is forwarded to an abutment where it is halted and the saw blade thereafter cuts the material length and the said length is again forwarded to the same or another abutment where it is halted for further cutting. In an alternative construction there is a uniform, continuous feeding of the material length feeder which, during forwarding, is cut into the desired pieces.

Figure 2:
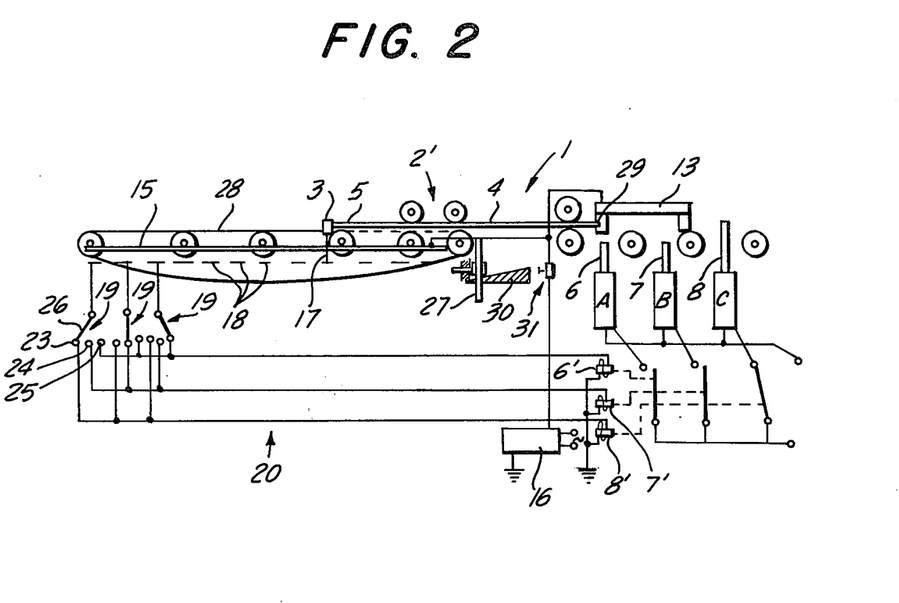
FIG. 2 shows a similar view of a second embodiment of the invention.

Such an alternative cutting apparatus is illustrated in FIG. 2, where the cross-cut saw 1 is provided with a roller feed means 2' and, optionally, a chain 28 driven thereby with a carrier 3 which engages against the rear end 5 of the material length 4 and accompanies this during fowarding of the material length. The abutments 6, 7 and 8, the cross-cut saw 27 and the bus-bar divided into sections 18, are interconnected in relatively fixed positions and are reciprocally movable as a combined unit in the direction of movement of the material length. This combined unit remains stationary in a starting position (as shown in FIG. 2) until the leading end 29 of the material length 4 engages the selected one of the abutments 6, 7 and 8, whereupon the combined unit travels forward together with the material length 4 during the cutting process. The cutting process is thus effected while the combined unit is advanced, with the material length, by driving the saw blade 27 up a rigidly mounted inclined edge or wedge 30 so that the saw blade 27 is moved transversely of the material length and thereby cuts the material length. When the saw blade reaches the end of the inclined edge 30 it actuates a microswitch 31 which, for an instant, connects current from a low voltage current source 16 to a drive means, not shown, for the ejector means 13 and to the bus bar 15 so that a current pulse is transmitted via the bus bar 15, contact member 17 with carrier 3, one of the bar section 18 and one of the selectors 19 in the programming device 20 to relays 6', 7' and 8', for determining the selection of the abutment to be brought into working position by suitable means, for example pneumatic or hydraulic means, for defining the length of the next portion to be sawn from the material length. Actuation of the microswitch 31 also connects current from the source 16 to drive means, not shown, for the ejector means 13, and accordingly the cut portion of the material length is ejected. The saw blade is retracted transversely of the material length, down the inclined edge 30, and the aforesaid combined unit is returned to its starting position. After the combined unit comprising the saw blade 27, bar sections 18 and the abutments 6, 7 and 8 have been returned to starting position, they remain stationary until the forward end 29 of the length of material 4 again engages one of abutments 6, 7 or 8, which is in working position and the entire operation as described hereinabove is repeated. In order to avoid too great a pressure against the material length 4 during forwarding of the combined unit, and possible relative movement of the material length and the saw blade, during the cutting process, these are connected during forwarding directly to the roller feed means 2' by means of a device not shown.

Figure 3:
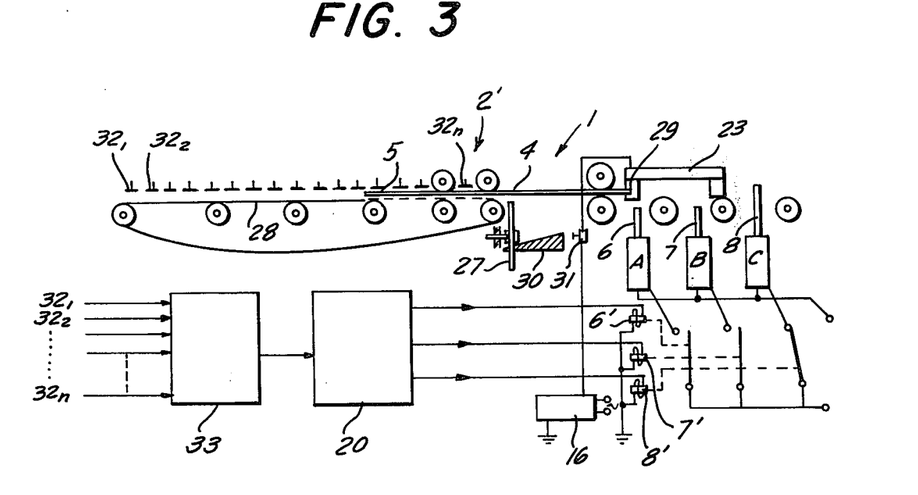
FIG. 3 shows a similar view of a third embodiment of the invention.

An alternative embodiment of the measuring device of FIG. 2 is shown schematically in FIG. 3. An array of equally spaced sensor means $32m$, where $m = 0, 1, 2, \ldots n$, is arranged above the path of movement of the elongate member 4 to be cut. The sensor means are suitably photoelectric devices, e.g., of the infra-red type where the emitter and collector of each of the devices are mounted adjacent each other. If the elongate member is present between the conveyor 28 and one of the photoelectric devices, the light from the emitter will be reflected by the elongate member back to the collector, whereas if there is no elongate member between the conveyor 28 and the photoelectric device the light is not reflected back to the collector. A position multiplexer and detector device 33 serves to detect the position where the transition between a light and dark area occurs, and thereby determine directly the actual length of the elongate member 4 that is to the rear of the saw 27. A programmable device 20 connected to the device 33 serves automatically and at any time to determine the optimum lengths into which the elongate member may be cut by the saw 27, and the abutment members 6, 7 and 8 may be brought selectively into engagement with the forward end of the elongate member to determine the proper partial lengths of the member 4. It would be obvious to the expert to replace said optical devices by pneumatic means, e.g., fluidic elements.

Figure 4:
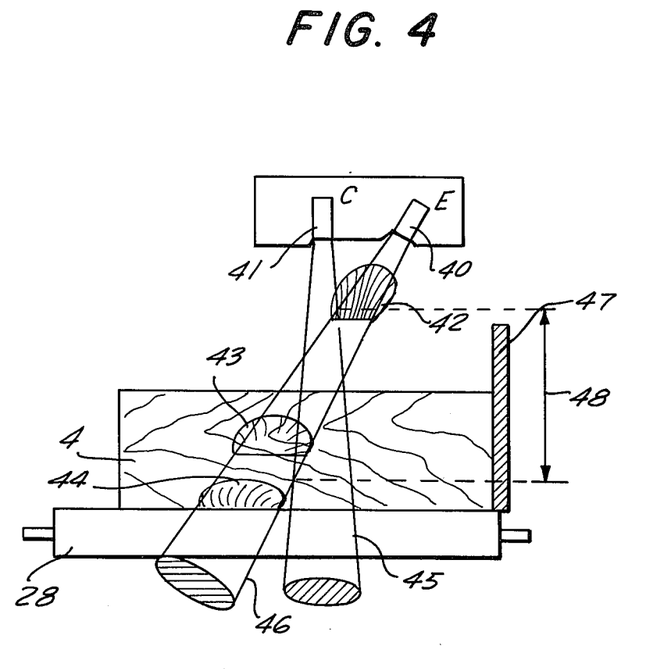
FIG. 4 shows an enlarged view of one of several sensor devices of the third embodiment.

FIG. 4 illustrates a preferred arrangement of the light emitter 40 and the light collector 41 of one of the photoelectric devices $32m$ in FIG. 3. The view shown in FIG. 4 is a sectional view taken at right angles to the direction of movement of the elongate member 4. As shown in FIG. 4, the conveyor 28 employs rollers rather than the endless belt shown in FIG. 3. Extending longitudinally adjacent the conveyor 28 is a stationary, vertical abutment member 47 serving to guide the elongate member 4 along its path of movement. The light source or emitter 40, for example an ordinary incandescent lamp having a lens or a LED (Light Emitting Diode), provides a narrow output light beam 46, and the light detector (or collector) 41 has a relatively narrow collection cone 45. The axis of the output light beam 46 from the light source 40 is oblique to the axis of the collection cone 45 of the light detector 41. FIG. 4 shows light reflection lobes 42, 43 and 44 for different heights of reflecting surface above the conveyor 28 to illustrate how light is detectable by the collector at various thicknesses of the elongate member. In order to operate correctly, the photoelectric device must be able to detect reflexes from the elongate member, but not from the support 28. The light lobes 42 and 43 indicate clearly that detection of the elongate member 4 is only effective within the thickness level range 48 is indicated. The lobe 44 would therefore not give rise to a detection by the detector 41.

Figure 5:
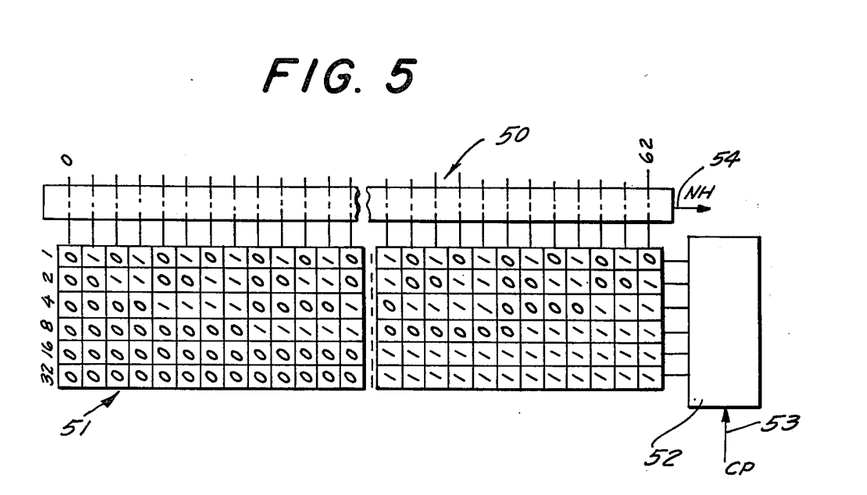
FIG. 5, 6 and 7 show circuit diagrams illustrating the electronic circuits whereby the sensor devices are operated in conjunction with other parts of the third embodiment of the invention.

FIG. 5 shows the operating scheme for the optical measuring system illustrated in FIG. 3. As shown in FIG. 5, 63 photoelectric devices $32m$, where $m = 0, 1, 2, \ldots 62$, are mounted on a horizontal measuring beam 50. Each cross line on the beam denotes the position of a light source 40 and photocell detector 41 which converts a light reflex from the elongate member 4 into an electrical signal. The photocells 41 are connected in a logical array in such a manner that all of the 63 devices $32m$ can be sampled in turn, starting at that end of the beam 50 which is further from the saw 27. In this manner the position of the rear end of the elongate member 4 will be detected somewhere along the length of the beam 50. The sampling if performed by a reset 6-bit binary counter 52, which inspects the photocells in turn, and the table 51 is merely included to show the binary identity of each photocell 41. The counter 52 has a clock pulse input 53, and the outputs from the photocells are received on a common line 54. The line 54 will normally be high (NH), but will go low when the rearward end of the elongated member 4 is reached and light reflected from the member 4 is detected by one of the detectors 41 as a transition from darkness to light. When the output on the line 54 goes low, the counter 52 is caused to halt at a counted value corresponding to the length of the length of the elongate member 4 to the rear of the saw 27. This counted value, or "length number" of the elongate member, corresponds to the optimum divisional lengths to be cut from the elongate member. Such optimum divisional lengths are programmable and will be a mere function of the overall length of the elongate member to be cut, as explained earlier.

Figure 6:
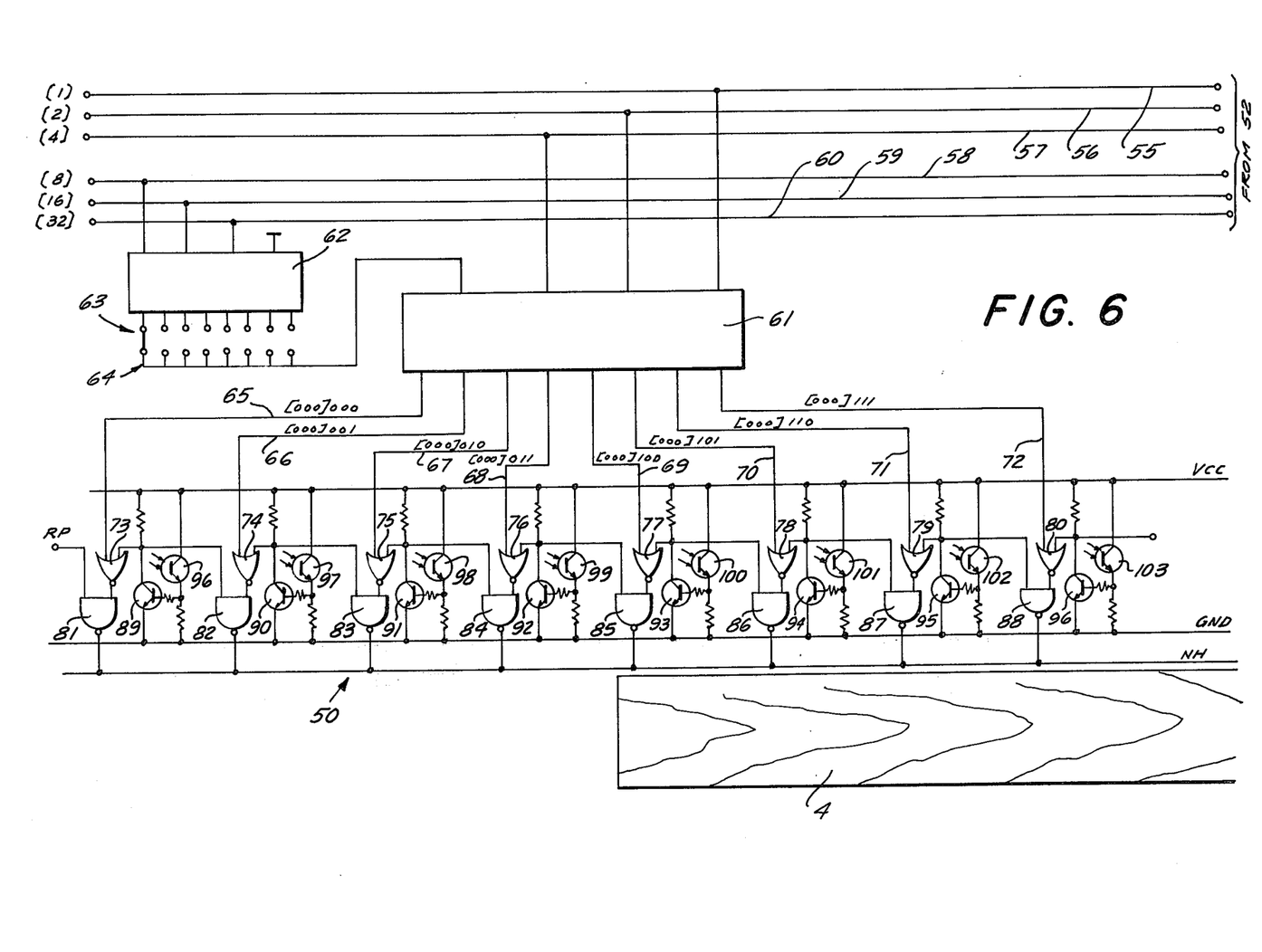

FIG. 6 shows in more detail part of the circuit of FIG. 5. The beam 50 consists of a frame into which 8 printed circuits have been mounted. Each printed circuit is of the kind shown in FIG. 6, and comprises 8 photoelectric devices, i.e., light source and photocell detector. If the separation between each two adjacent photoelectric devices is, e.g., 5 centimeters, then each printed circuit will be able to cover 40 cm of detection length. The eight printed circuits are connected together in tandem. Thus, the lines 55 – 60 from the counter 52 extend along the full length of the beam 50, and so do the Vcc and Ground (GND) lines as well as the output line 54, which is normally high (NH). At each measurement location there is a light source 40. For reasons of simplicity, the light sources and their respective power supplies are not shown in FIG. 6.

Each printed circuit includes two decoder units 61 and 62 connected to the lines 55 – 60. The decoder 62 is connected to the lines 58, 59 and 60 and is provided with a link system 63, and only one link is installed in each of the eight printed circuits. Thus, the link shown in FIG. 6 is at point 0, in the next circuit the link will be at point 1, and so on unto point 7, which will be the printed circuit next to the saw blade. The two decoders are suitably each of the integrated circuit type. The outputs from these decoders are normally high (NH). The decoding is of the type from binary to "one out of fifteen." The decoded output will therefore go low (L). However, no numeral higher than 7 is used. The line 64 connecting the decoder 62 with decoder 61 will be low for that output from the decoder 62 which corresponds to a selected combination of bit values on the lines 58 – 60, and in other cases will always be high. The binary counter 52 starts counting at 0, and counts upwardly to 63 on the basis of 6 bits. These 6 bits are indicated in FIG. 6 by the lines 55 through 60 inclusive, where the lowest bit (LSB) is on lines 55 and the highest bit (HSB) is on line 60.

The link of the decoder 62 is effective to choose one out of the eight printed circuit cards. The line 64 to input D on decoder 61 will go low (L) when the input binary code (on lines 58 – 60) coincides with the chosen connection. When the decoder 61 input D goes low, the first 3 bits, on the lines 55 – 57, will be decoded, and lines 65 – 72 from the decoder 61 will in succession go low (L).

Each two successive photocells are connected to a comparison network. For example, the photocells 99 and 100 are connected to a comparison network comprising inverting transistors 92 and 93, a NOR-gate 77, and a NAND-gate 85.

None of the photocells to the left of the end of the elongate member 4 receives any reflected light. The photocells to the right of the end receive reflected light. Thus, the photocell 99 is not illuminated and its emitter remains low while the photocell 100 is illuminated and its emitter is high. The transistor 92 applies a 1 to one input of the NAND-gate 25, and the transistor 33 applies a 0 to one input of the NOR-gate 77. When the line 69 is low, the NOR-gate 77 provides a 1 output and the NAND-gate 85 accordingly provides a 0 output and the line 54 goes low. It will be appreciated that if neither photocell were illuminated, the NOR-gate 77 would have a 0 output irrespective of the signal value on the line 69, and the NAND-gate 85 would therefore have a high output. Thus, as the lines 65–72 go low in succession, the output line 54 will remain high until the line 69 to the gate 77 goes low, i.e., for the counting value 000100, whereupon the output line 54 goes low. The counter 52 then stops counting and indicates that the elongate member fed in has the length value number 000100.

In FIG. 6, the link has been connected on the leftmost terminals of the decoder 62. This means that, when the counter 62 starts counting, the lines 65 – 72 will successively go low. When the value goes low, the inflow from the respective photocell transistors 96 – 103 will be enabled. When light impinges on one of the photocell detectors 96 – 103, the corresponding gates 73 – 80 and 81 – 88 connected to the transistors 89 – 95 respectively, will go low.

Figure 7:
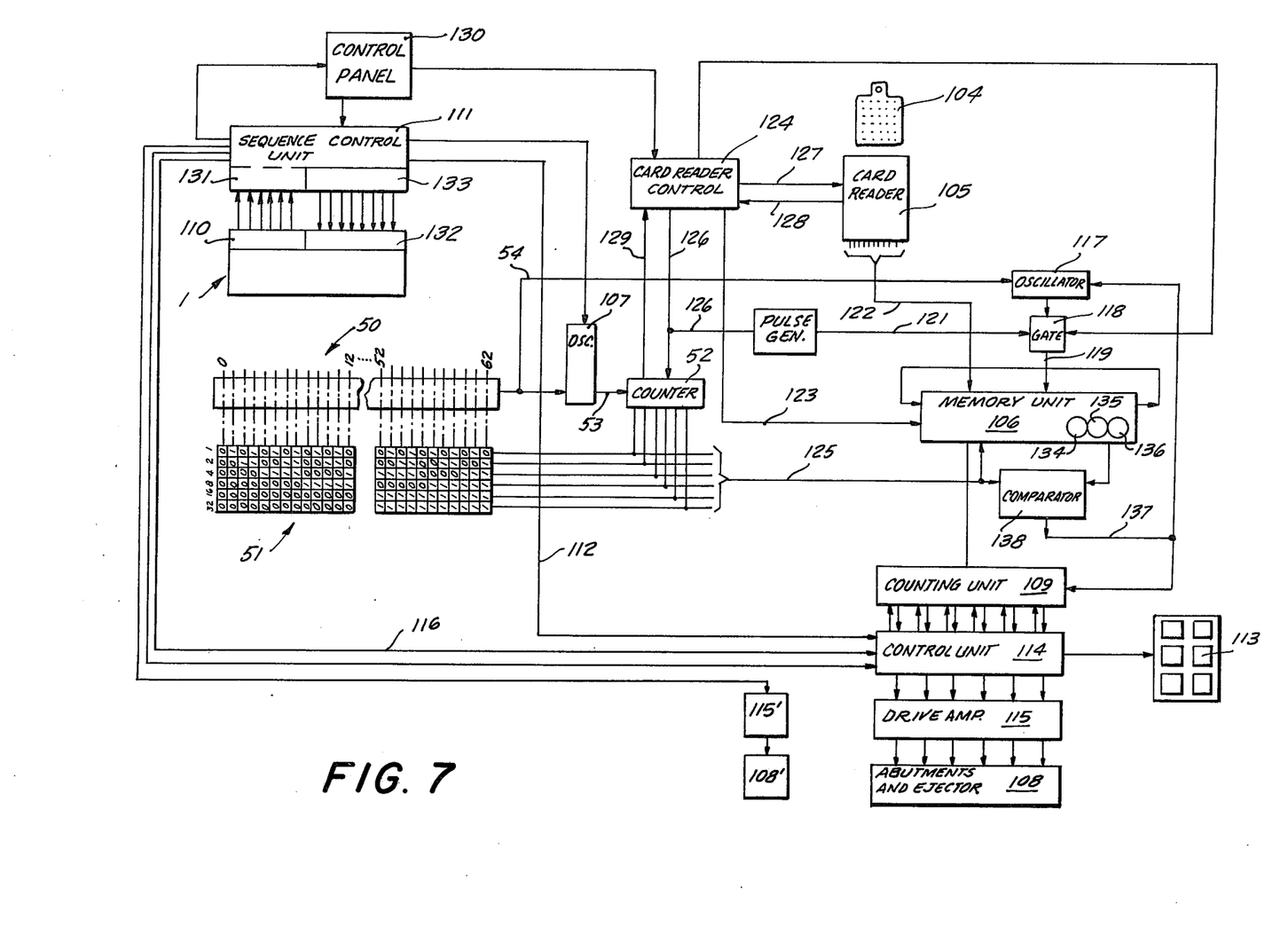

FIG. 7 is a block diagram of the various elements used in determining the length of an elongate member to be cut and the optimum length portions into which it should be cut. FIG. 7 shows, simply as a block, the mechanical parts of the sawing apparatus 1. The apparatus 1 include microswitches 110 for registering movement of the mechanical parts such as clamps and the saw blade, and for registering when the elongate member is in the correct feed-in position. The microswitches 110 fed their signals through optical couplers 131, to ensure noise-free signals, to a sequence control unit 111. The sequence control unit 111 responds to these signals and to other signals received thereby, from the components illustrated in FIG. 7, to energize amplifiers 133 for driving solenoid valves 132 which operate to initiate movement of the mechanical parts such as the aforesaid clamps, the saw blade, and means for correctly positioning the elongate member in the feed-in position. Thus, the microswitches 110 and the solenoid valves 132 co-operate with the sequence control unit 111 in accordance with conventional process control techniques to ensure correct sequential operation of the aforesaid mechanical parts of the machine.

The elements shown in FIG. 7 are for use in controlling six pneumatically-operated abutment members, not three as shown in FIG. 1, each abutment member being provided with a microswitch, similarly to the abutment members shown in FIG. 1. The six abutment members and the ejector means 13 (FIG. 3) are designated generally at 108 in FIG. 7. The driver amplifier unit 115 shown in FIG. 7 receives signals indicating which abutment member should be advanced, and amplifies these signals to drive solenoid valves which in turn control the abutment members. The unit 115 also controls the ejector means 13.

The apparatus also comprises an auxiliary abutment member 108' which is controlled by a control unit 115'. This auxiliary abutment member is advanced to prevent forward movement of an elongate member while it is being measured, using the measurement column 50, and is then retracted and remains retracted while the cutting operation takes place under control of the abutment members 108.

Elongate members of various lengths are to be cut according to a predetermined program, and this implies that the various required cut lengths in number and dimensional length are adapted to the 63 possible lengths of elongate members fed into the machine. The programming is performed by punching holes in a programming card 104, which can be of any conventional type and usable with a card reader 105, e.g., of the type ADDO 41-8081-00. The complete cutting program is recorded on two cards A and B, each having 35 rows of readable information, each row including 24 bits. The first row of data recorded on the card A is the cutting instructions for an elongate member of the greatest original length, i.e., an elongate member which has the length number 000000 when its length is measured with its forward end engaging the auxiliary abutment member 108'. The second row is the cutting instructions for an elongate member of the second greatest original length, i.e., an elongate member of length number 000001. The card A thus carries the cutting instruction for elongate members of the 35 greatest original lengths, i.e., the 35 lowest length numbers, while the first 28 rows on the card B carry the cutting instructions for the remaining 28 measurable original lengths, i.e., the remaining 28 higher length numbers. Thus, the position of each row corresponds to the length number of an elongate member.

The output of the card reader 105 is connected by a line 122 to a memory unit 106. The memory unit comprises a series in- series our memory shift register 136 and read-in and read-out shift register 134 and 135 each of the parallel in/out -series in/out type connected in series with the register 136. The output of the register 136 is connected to the series input of the register 134, so that the data stored in the unit 106 can be circulated through the registers 134, 135 and 136 on receipt of shift pulses on the line 119 and will remain stored in the memory unit 106.

When reading-in cards, the panel 130 is set for the read-in of the two cards A and B. Thereby, the read-in and card-reader control unit 124 is activated. Simultaneously, the unit 118 is opened so that the line 119 for supplying shift pulses to the unit 106, is connected to line 121. The unit 124 starts the motor of the card reader. After the card 104 has been inserted, the card reading is commenced by depressing a suitable push button on the panel 130. The first row is read off (24 bits in parallel), and the data are fed through line 122 to the read-in register 134 of the memory.

Simultaneously, a first pulse is fed from the card reader control unit 124 to the binary counter 52 by way of the line 126 and the counter generates the code 000000 on the line 125. The control unit 124 supplies a read-in pulse to the memory unit 106 on the line 123, and accordingly the data delivered on the line 122 are written into the register 134 and the code 000000 is written into the register 135.

In order to provide space for the next set of data from the card reader 105 and the counter 52, the contents of the registers 134 and 135 must be shifted into the register 136. To achieve this, the control unit 124 delivers another pulse on the line 126 and this pulse clocks the counter 52 to generate the code 000001 and activates a 125 kHz pulse generator unit 120 to generate a pulse train of 44 pulses which is applied through the lines 121 and 119 (the gate unit 118 being open) to shift the first data word, in the registers 134 and 135, into the memory register 136. Thereafter, the control unit 124 applies a step shift pulse to the line 127, the card A is shifted to read the second row of data from the card, a read-in pulse is applied to the line 123 and the process is repeated, the data on the line 122 being written into the register 134 and the code 000001 being written into the register 135 and the contents of these registers then being shifted into the memory register 136. (In fact, the register 136 comprises three static shift registers having a total capacity of 3072 bits.)

When the counter 52 has arrived at the number 35 (code 100011), all 35 rows on card A have been read off and stored in the memory, and a decoder in the counter 52 reads off the number 35 and sends a signal through line 129 to the unit 124. A stepping electromagnet and a return electromagnet respond to this signal and the card reader is thereby restored to a starting condition for replacing the card A by the card B. When the card B is inserted in the card reader, the panel 130 is again set for continued reading in.

At the row number 32 of the first card the signal generated by the counter 52 on the line 125 will be binary 32 and therefore the highest, i.e., the first, bit of the 6-bit code written into the register 135 will go high, and this event is used to change the illumination condition of some indicator lamps (not shown), e.g., labelled A and B corresponding to the different punched cards.

When the total of 63 rows has been read in, a pulse is transmitted through the decoder in the counter 52 onto line 129 with the result that the card B is returned, the motor of the card reader machine is stopped, and the control panel 130 indicates a completed reading-in of the program cards. The unit 124 also changes the logic of the system for read-out from the memory unit 106, by switching the unit 118 such that shift pulses for circulating the memory unit are passed from the unit 117 onto line 119 provided that line 137 is low (L).

Upon completion of the reading-in of cards, elongate members will be presented on the feeding-in side of the machine, and the start button on the control panel 130 is operated. Thereby, the first elongate member is fed into the machine and will halt against the auxiliary abutment member 108' which has been actuated into operative position by the sequence control unit 111. The unit 111 will then receive a microswitch response from the abutment member 108', and this results in a "start measurement" signal being transmitted from the unit 111 to the clock unit 107 simultaneously with the counter 52 being zero-set. The unit 107 consists of an oscillator operating at a selected frequency of 8 kHz, and being started by the "start measurement" signal. The clock unit 107 is stopped by a low signal on line 54, which is the measurement response line from the measurement column 50. Pulses from the clock unit 107 are fed to the binary counter 52 through the wire 53, and the counter 52 is thereby counted up. The counted-up value, which starts with 0 and ends with 62, or in binary form starts with 000000 and ends with 111110, is supplied through the six wires 55-60 to the logic circuits of the measuring column. The measuring column, as described with reference to FIGS. 4, 5 and 6, consists of 63 optical measurement groups. Somewhere under the measuring column is the rear end of the elongate member, which has been fixed in a measuring portion by engaging the abutment member 108'. All the measurement groups will show (L) where there is no elongate member and (H) where there is an elongate member (reflected light). The count value on the six wires requests, starting with the number 0, each optical measuring group whether the preceeding group is (L) and the present group (H). If that is the case, a measurement response is obtained on line 54, and the oscillator 107 stops and thereby also the counter 52. The counted value in the counter thus constitutes the length number of the elongate member. This length number is thus fixed on line 125, and is fed to the comparator 138 and is compared with the corresponding numbers which are to be sought in the memory unit 106. In order to achieve this, the measurement response on the line 54 also starts a 250 kHz shift pulse oscillator 117 which circulates the data stored in the memory unit 106 (63 words each of 44 bits) until the data word with the same 6-bit length number (originally written into the register 135 from the counter 52) as the length number fixed on the line 125 is detected by the comparator 138. The registers 134 and 135 form a kind of window which enables the comparator 138 to inspect the passing data flow. When coincidence is detected by the comparator 138, a signal is generated on the line 137. This coincidence signal stops the oscillator 117, whereby circulation of data in the unit 106 is stopped and the data contents of the word that was sought become available on the parallel outputs of the registers 134 and 135: the 24 bits written into the register 134 from the line 122 and the 6-bit length number written into the register 135 from the line 125. Thus, when coincidence is detected the contents of the register 134 represents the required number of cuts for each of the six abutment members 108, corresponding to the original programming on the cards: for each of the six abutments members a 4-bit byte represents the number of cuts for that abutment member.

The unit 109 comprises six, 4-bit counters, one for each of the abutment members 108. When the coincidence pulse is generated on the line 137, the six counters of the unit 109 are preset with numbers represented respectively by the six bytes contained in the register 134. The unit 109 also contains a sensor which indicates whether the number in each of the counters is zero or non-zero. Also connected to the control unit 114 is a counting unit 113 comprising six electromechanical counters associated respectively with the six abutment members 108, i.e., one for each possible cutting length. sequence control unit 111, responding to the microswitches 110 and actuating the solenoid valves 132 and delivering signals to the control unit 114. Thus, when a cut is to be performed the sequence control unit 111 delivers an abutment activate signal on the line 116 to the unit 114. The unit 114 inspects the counters in the unit 109 and thereby determines which is the longest cutting length for which the number of cuts required is non-zero, and then energizes the drive amplifier 115 to advance the abutment member 108 associated with the selected cutting length. The elongate member 4 is advanced to engage the selected abutment member, and a cut is made. When the cut has been made, the sequence control unit 111 provides a countdown and eject signal on the line 112, and the unit 114 reduces the count stored in the counter of the unit 109 for the selected cutting length by one, operates the ejector means 13 (FIG. 3), and increases by one the count in the counter of the unit 113 for the selected cutting length. When this operation has been completed, the unit 111 delivers another abutment activate signal on the line 116 and the operation is repeated. This is continued until each of the counters of the unit 109 contains a count of zero.

When the last cut has been performed, the sequence control unit 111 delivers a start measurement signal and a new elongate member comes to rest against the auxiliary abutment member 108', and the operation is repeated.

If the required length of elongate member is not traceable in the memory, there might either be an error in the ordering of the elongate members to be cut, or in the memory data contents. An indication signal will be given in such cases by a lamp (not shown) indicating data failure.

The cutting time is determined by the sequence control unit 111 in cooperation with the control 130. The control 130 also ensures that the system is zero-set when the machine is turned on and provides the possibility of operating the machine manually.

It is to be understood that the invention is not limited to the specific constructions shown and described, as it will be apparent to those skilled in the art that changes may be made without departing from the principles of the invention as defined in the appended claims.

I claim:

1. An apparatus for cutting an elongate member of arbitrary length into shorter sections of predetermined respective lengths, comprising a cutting element, means for advancing the elongate member past the cutting element, a plurality of abutment members located at different positions forward of the cutting element, operating means whereby the abutment members are selectively brought into and removed from the path of movement of the elongate member, a plurality of sensor devices arranged at equally spaced intervals to the rear of the cutting element for sensing the length of the elongate member that is to the rear thereof, the programmable means connected between the sensor devices and said operating means to determine which of said abutment members is brought into the path of movement of said elongate member, and thereby the length of the elongate member that is forward of the cutting element, in dependence upon the length of the elongate member that is to the rear of the cutting element; and wherein the means for advancing the elongate member comprise a member engaging the rear end of the elongate member, and the apparatus further comprises an electrical conductor extending parallel to the path of movement of the elongate member at the rear of the cutting element and a contact member engaging the rear end of the elongate member and slidably connected to said electrical conductor and engaging the sensor devices as the elongate member is advanced thereby to indicate the position of the rear end of the elongate member.

2. An apparatus for cutting an elongate member of arbitrary length into shorter sections of predetermined respective lengths, comprising a cutting element, means for advancing the elongate member past the cutting element, a plurality of abutment members located at different positions forward of the cutting element, operating means whereby the abutment members are selectively brought into and removed from the path of movement of the elongate member, a plurality of sensor devices arranged at equally spaced intervals to the rear of the cutting element for sensing the length of the elongate member that is to the rear thereof, and programmable means connected between the sensor devices and said operating means to determine which of said abutment members is brought into the path of movement of said elongate member, and thereby the length of the elongate member that is forward of the cutting element, in dependence upon the length of the elongate member that is to the rear of the cutting element; and wherein each sensor device comprises a light source having a narrow output light beam directed towards a surface of the elongate member to illuminate a small area thereof, and a light detector having a narrow collection cone arranged to receive light reflected from said surface of the elongate member, the collection cone and the light beam crossing one another so that light of the light beam is reflected from said surface and is detected by the light detector for only a limited range of positions of said surface.

3. An apparatus as claimed in claim 2, comprising comparison means arranged to compare the outputs of each two successive light detectors of said plurality of sensor devices, thereby to detect the position of the rear end of the elongate member by determining which pair of light detectors includes one detector which is receiving light and one detector which is not receiving light.

4. An apparatus as claimed in claim 3, wherein the comparison means comprises a counter whereby each sensor device is interrogated in turn, starting with the sensor device furthest from the cutting element, to determine whether the light detector of that sensor is receiving light and the light detector of the preceding sensor is not receiving light, and the counter determines the number of sensor devices which are interrogated before reaching the fist sensor device whose light detector is receiving light.

5. An apparatus as claimed in claim 2, wherein said programmable means include a memory unit and a device for reading data from a data carrier and entering such data into the memory unit.

6. An apparatus as claimed in claim 5, wherein the data reading device is a punched card reader.

7. An apparatus as claimed in claim 1, wherein the abutment members, the sensor devices and the cutting element are interconnected in relatively fixed positions with respect to movement in the direction of advancement of the elongate member, so that when the elongate member engages a selected abutment member upon operation of the advancing means the abutment members, the sensor devices and the cutting element are advanced with the elongate member, and wherein the apparatus comprises means responsive to such advancing movement of the cutting element to actuate the cutting element to cut the elongate member.

8. An apparatus as claimed in claim 2, wherein the abutment members, the sensor devices and the cutting element are interconnected in relatively fixed positions with respect to movement in the direction of advancement of the elongate member, so that when the elongate member engages a selected abutment member upon operation of the advancing means means responsive to such engagement will actuate the cutting element to cut the elongate member.

* * * * *